US012005984B2

(12) United States Patent
Nitzen

(10) Patent No.: US 12,005,984 B2
(45) Date of Patent: Jun. 11, 2024

(54) ADJUSTABLE SEAT BUMP STOP FOR A MOTORCYCLE

(71) Applicant: Ryan Patrick Nitzen, Tustin, CA (US)

(72) Inventor: Ryan Patrick Nitzen, Tustin, CA (US)

(*) Notice: Subject to any disclaimer, the term of this patent is extended or adjusted under 35 U.S.C. 154(b) by 535 days.

(21) Appl. No.: 17/326,230

(22) Filed: May 20, 2021

(65) Prior Publication Data
US 2022/0371679 A1 Nov. 24, 2022

(51) Int. Cl.
B62J 1/28 (2006.01)

(52) U.S. Cl.
CPC .................................. B62J 1/28 (2013.01)

(58) Field of Classification Search
CPC .......................................................... B62J 1/28
USPC ........................................ 297/215.11, 215.12
See application file for complete search history.

(56) References Cited

U.S. PATENT DOCUMENTS

| 2,307,709 | A | * | 1/1943 | Ooton | B62J 1/28 |
| | | | | | 297/452.31 |
| 2,966,938 | A | * | 1/1961 | Ooton | B62J 1/28 |
| | | | | | 297/352 |
| 3,940,166 | A | * | 2/1976 | Smithea | B60R 22/00 |
| | | | | | 297/229 |
| 4,909,522 | A | * | 3/1990 | Flanigan | B62J 1/28 |
| | | | | | 297/214 |
| 5,553,915 | A | * | 9/1996 | Stamatakis | B62J 1/162 |
| | | | | | 297/215.11 |
| 6,007,150 | A | | 12/1999 | Clerkin et al. | |
| 6,273,207 | B1 | * | 8/2001 | Brown | B62J 1/12 |
| | | | | | 297/195.1 |
| 8,371,652 | B2 | * | 2/2013 | Revell | B62J 7/08 |
| | | | | | 297/352 |
| 9,132,874 | B2 | | 9/2015 | Sam et al. | |
| 10,183,714 | B2 | | 1/2019 | Jones | |
| 10,625,801 | B2 | | 4/2020 | Chiba | |
| 2002/0069464 | A1 | | 6/2002 | Welch | |
| 2008/0084097 | A1 | | 4/2008 | Botting | |
| 2010/0219609 | A1 | | 9/2010 | Wootton | |

FOREIGN PATENT DOCUMENTS

| DE | 20318104 U1 * | 4/2004 | .............. A47C 7/383 |
| FR | 2747290 A1 * | 10/1997 | .............. A47C 7/383 |

* cited by examiner

Primary Examiner — Kevin Hurley
(74) Attorney, Agent, or Firm — Eric Karich; Karich & Associates

(57) ABSTRACT

A seat bump stop has a pad having a first end and a second end separated by a width of 3-8 inches, the pad having a height that is between 1-5 inches. The seat bump stop further includes a mounting system for adjustably and removably mounting the pad on the motorcycle seat. The mounting system including a first strap attached to the first end of the pad, a second strap attached to the second end, and a fastener for fastening the first and second straps around the motorcycle seat.

7 Claims, 3 Drawing Sheets

ADJUSTABLE SEAT BUMP STOP FOR A MOTORCYCLE

BACKGROUND OF THE INVENTION

Field of the Invention

This invention relates generally to motorcycle accessories seats, and more particularly to an adjustable and removable seat bump stop for a motorcycle.

Description of Related Art

It is desirable to teach a person learning how to ride a motorcycle where to seat himself or herself on the seat of the motorcycle. While this can be done verbally, it would be useful to have a device that physically limits the rider's movement to the correct position, while they are learning.

The prior art teaches "bump stops" that are adhesively bonded to the motorcycle or the seat. For example, an existing product includes a small foam tube that is bonded to the foam core of the motorcycle seat, and then covered with the seat cover. This bump stop is not adjustable or removable.

The prior art also teaches a variety of back rests and similar support devices that can be mounted on a motorcycle for supporting the back of the rider, for his or her comfort. For example, Chiba, U.S. Pat. No. 10,625,801, teaches backrest mounted on a seat body of the motorcycle. While this backrest supports the user's back for his or her comfort, it is not suitable for training a beginner how to sit on the motorcycle correctly, and it is not readily adjustable in position.

Paige, U.S. Pat. No. 2,966,938, teaches a seat divider and rest that is mounted onto the motorcycle seat via L-shaped side brackets that are adjustably mounted on the seat. A similar back rest is shown in Paige, U.S. Pat. No. 2,307,709.

The prior art teaches various products that are semi-permanently installed on or near a motorcycle seat. However, the prior art does not teach an adjustable and removable motorcycle seat bump stop.

SUMMARY OF THE INVENTION

The present invention teaches certain benefits in construction and use which give rise to the objectives described below.

The present invention provides a seat bump stop for a motorcycle seat, the seat bump stop comprising a pad having a first end and a second end separated by a width of 3-8 inches, the pad having a height that is between 1-5 inches; and a mounting system for adjustably and removably mounting the pad on the motorcycle seat. The mounting system may include at least one strap, and a fastener for fastening the at least one strap around the motorcycle seat.

In another embodiment, the invention is a seat bump stop for a motorcycle seat, the seat bump stop comprising a pad having a first end and a second end separated by a width of about 4.5 inches, the pad having a height that is about 1.5 inches; and a mounting system for adjustably mounting the pad on the motorcycle seat.

A primary objective of the present invention is to provide a seat bump stop having advantages not taught by the prior art.

Another objective is to provide a seat bump stop that can be adjustably and removably mounted on a motorcycle for teaching a rider where to position himself or herself on the motorcycle seat.

A further objective is to provide a seat bump stop having a mounting system that allows easy adjustment of the position of the seat bump stop, and removal of the seat bump stop, when desired.

A further objective is to provide a seat bump stop that is large enough to guide a rider in correct positioning, but small enough to not interfere with the rider's movement on the motorcycle.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
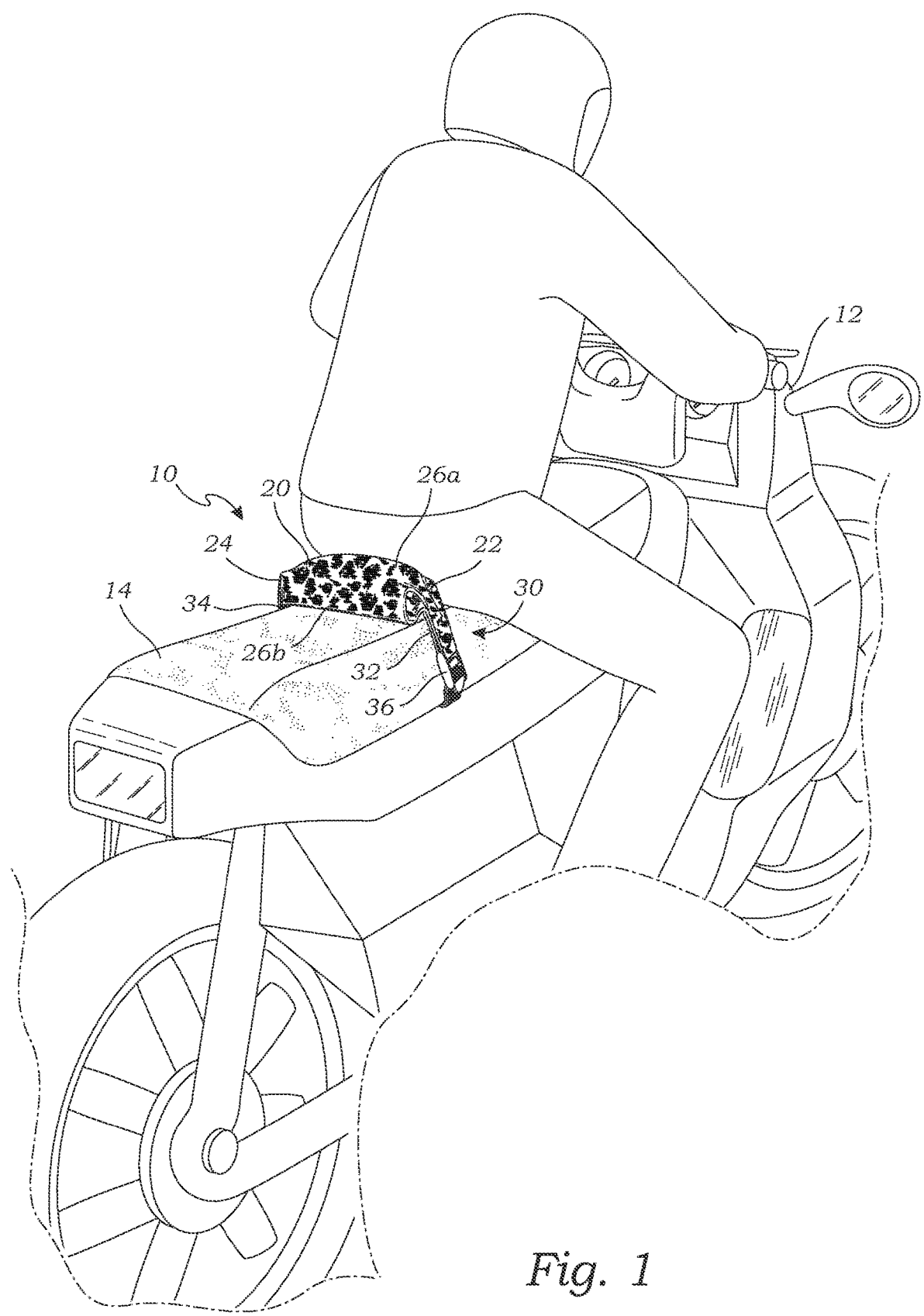
FIG. 1 is a perspective view of a seat bump stop mounted on a motorcycle seat according to one embodiment of the present invention.

FIG. 1 is a perspective view of a seat bump stop 10 mounted on a motorcycle seat 14 of a motorcycle 12 according to one embodiment of the present invention. As shown in FIG. 1, the seat bump stop 10 includes a pad 20 and a mounting system 30 for adjustably and removably mounting the seat bump stop 10 to the motorcycle seat 14. As shown in FIG. 1, the pad 20 is adapted to be positioned on top of and frictionally engage the motorcycle seat 14, while the mounting system 30 fits around the seat so that the position of the seat bump stop 10 may be readily adjusted to fit the rider of the motorcycle 12.

For purposes of this application, the term "adjustable" is defined to mean that the position of the bump stop can be moved forward and backward on the motorcycle seat with minimal effort in less than 1 minute and without the use of tools, except for any tools that may be needed to lift the motorcycle seat.

For purposes of this application, the term "removable" is defined to mean that the bump stop can be removed entirely from the motorcycle seat with minimal effort in less than 1 minute and without the use of tools, except for any tools needed to lift the motorcycle seat.

As shown in FIG. 1, the pad 20 includes a first end 22 and a second end 24, which are connected by a front surface 26a and a rear surface 26b. The front surface 26b is adapted to abut the rider of the motorcycle 12, so that the ride is able to determine his or her correct position on the motorcycle 12.

The seat bump stop 10 further includes a mounting system 30 for adjustably and removably mounting the pad 20 on the motorcycle seat 14. The mounting system 30 may include at least one strap and a fastener, and in this embodiment includes a first strap 32 attached to the first end 22 of the pad 20, a second strap 34 attached to the second end 24, and a fastener 36 for fastening the first and second straps 32 and 34 around the motorcycle seat 14.

Figure 2:
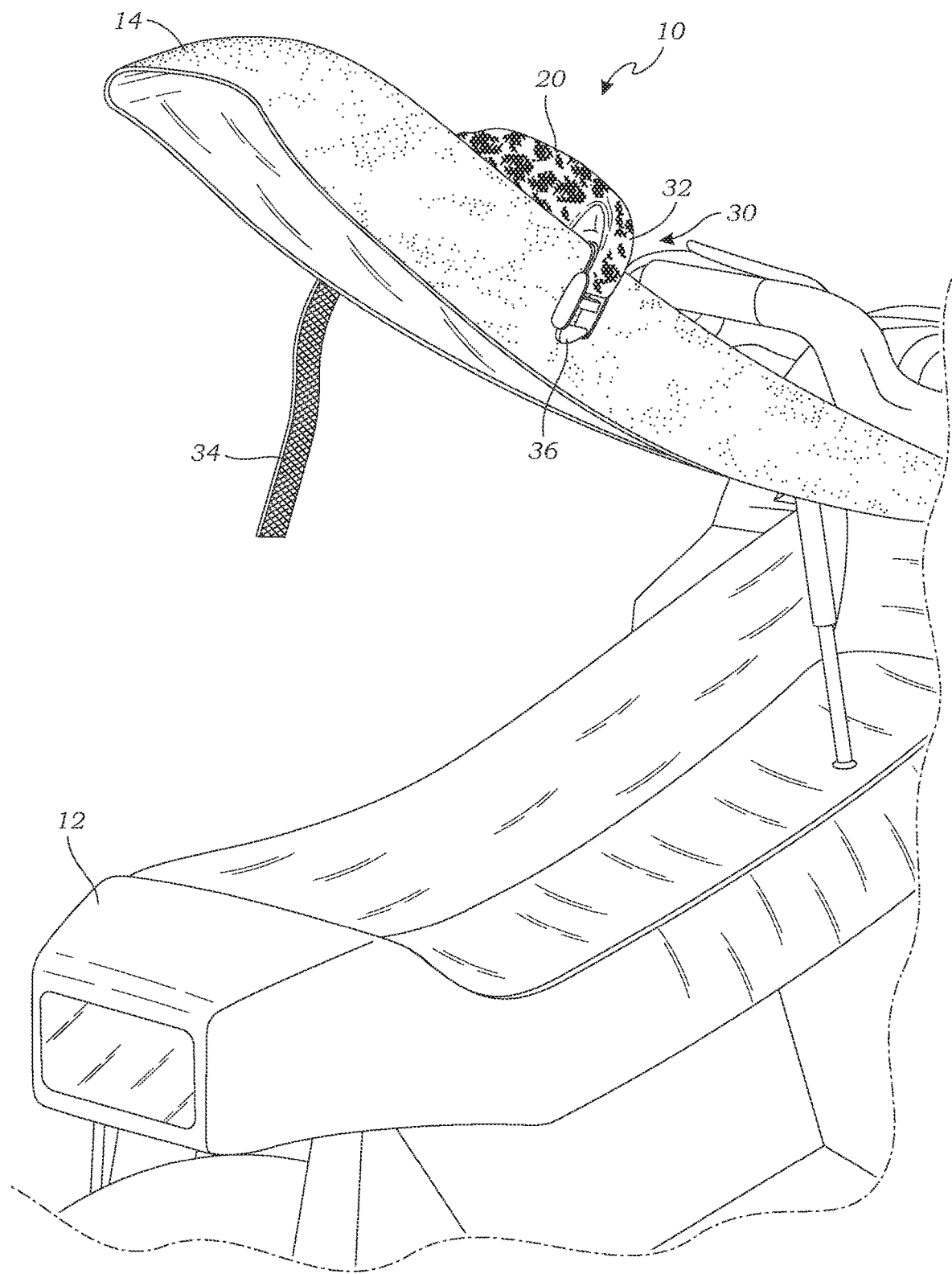
FIG. 2 is a perspective view thereof, wherein the motorcycle seat is hinged upward to show the seat bump stop being mounted on the motorcycle seat.

FIG. 2 is a perspective view of the seat bump stop 10 being installed on the motorcycle 12, wherein the motorcycle seat 14 is hinged upward to so that the seat bump stop 10 can be mounted on the motorcycle seat 14. As shown in FIG. 2, the first and second straps 32 and 34 may be wrapped around the motorcycle seat 14, once the seat has been lifted or otherwise raised or separated from the body of the motorcycle 12. The straps 32 and 34 may be tightened so that the pad 20 is held securely against the seat, to prevent movement.

While one embodiment of the fastener 36 is shown, any form of buckle, clip, snap, or other form if fastener known in the art may be used. Furthermore, while one version of the mounting system 30 is shown, any form of mounting system that allows for easy installation, removal, and adjustment may be used; for example, a single strap adapted to wrap around the motorcycle seat 14 and fasten to the pad 20 on the other side may be used, or any other mounting system known in the art.

As shown in FIG. 2, in use, the rider may hinge or otherwise lift the motorcycle seat 14 upward to secure the straps around the motorcycle seat 14, and adjust as desired before putting the seat 14 back down, wherein the pad 20 will be secured atop the seat 14.

Figure 3:
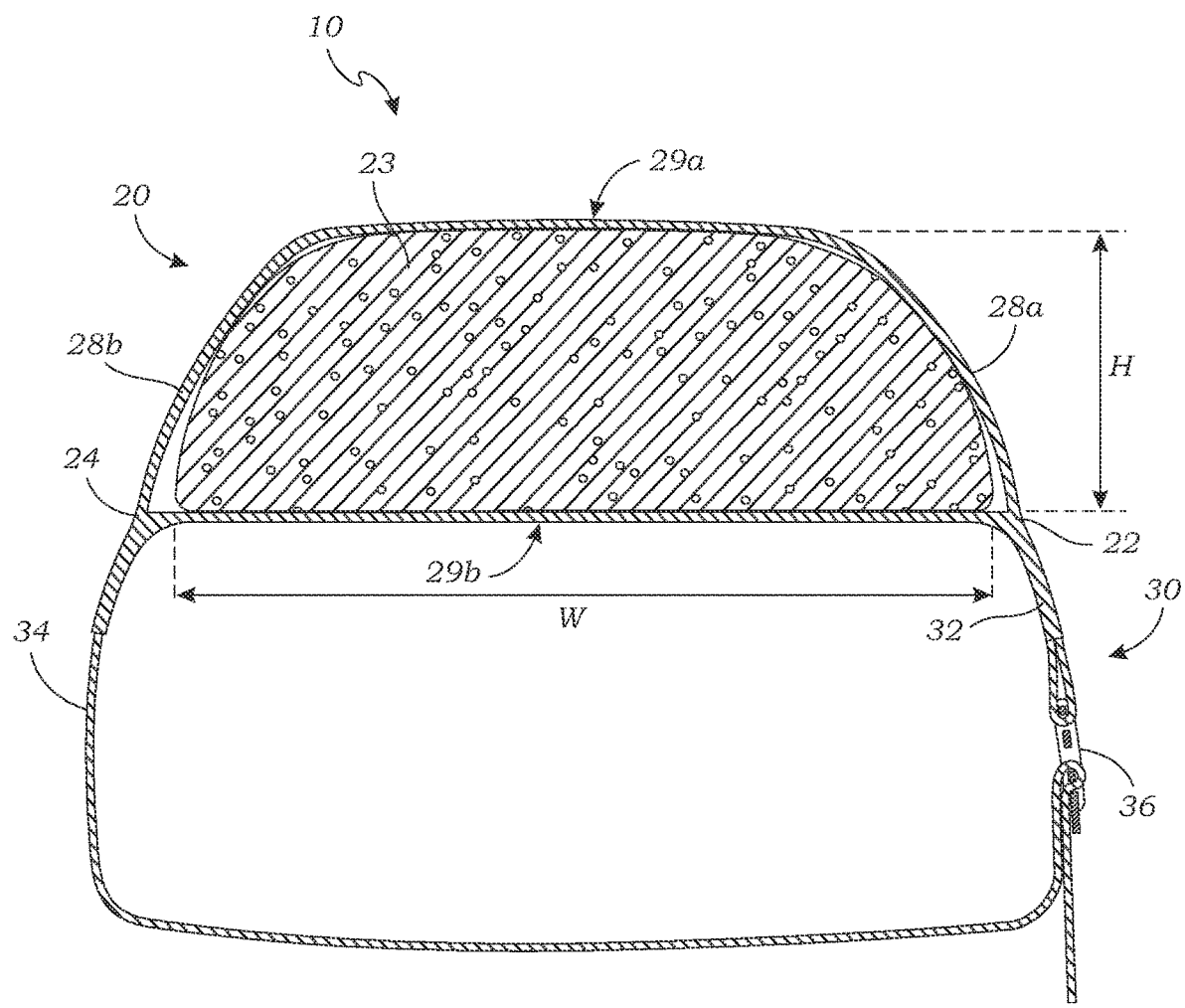
FIG. 3 is a front cross-sectional view of the seat bump stop.

FIG. 3 is a sectional view of the seat bump stop 10. As shown in FIG. 3, in this embodiment, the first end 22 has a first side surface 28a, and the second end 24 has a second side surface 28b, which are separated by a width W. The first and second side surfaces 28a and 28b are connected by a top surface 29a and a bottom surface 29b, which are separated by a height H. The bottom surface 29b forms the gripping surface that frictionally engages the motorcycle seat 14, as shown in FIG. 1.

As shown in FIG. 3, in this embodiment the pad 20 of the seat bump stop 10 includes an insert 23 within an outer layer that includes the various surfaces described above. The pad 20 has a width W that is between 3-8 inches, a height H that is between 1-5 inches, and a thickness that is between 1.5-6.5 inches. In this embodiment, the width W is about 4.5 inches, the height H is about 1.5 inches, and the thickness (between the front and rear surfaces 26a and 26b, shown in FIG. 1) is about 3 inches. While the pad 20 of this embodiment is generally rectangular, or perhaps trapezoidal, in alternative embodiments, the pad 20 may be a different shape, e.g., tubular, rounded, polygonal, etc., or any other shape suitable for use by the rider.

As shown in FIG. 3, the insert 23 may be constructed of soft and yielding material and is substantially surrounded by the outer layer. For the purposes of this application, "soft and yielding" is defined to include any materials with enough cushioning and resilience for the rider to repeatedly sit on/against in relative comfort, including, but not limited to, various types of foam (e.g., in the form of a sponge, micro-beads, etc.), fabric stuffing, down, paperboard blends, soft rubber or silicone, a mixture of these, or any other similar materials known in the art. In another embodiment, the pad 20 may be a single, solid construction of a suitable material that is firm enough to function as a bump stop, but preferably resilient enough to be comfortable for the rider.

As shown in FIG. 2, to mount the seat bump stop 10, the rider lifts the motorcycle seat 14 upwardly such that the straps 32 and 34 can be passed through underneath the motorcycle seat 14. Next, the seat bump stop 10 is positioned on the motorcycle seat 14, in a location determined for correctly positioning the rider on the motorcycle, such that the gripping surface 29b is in contact with the motorcycle seat 14, and the pair of straps 32 and 34 are disposed on either side of the motorcycle seat 14, wherein the rider may wrap the pair of straps 32 around the motorcycle seat 14 and secure them together with the fastener 34. The motorcycle seat 14 may then be returned to its original position, wherein the seat bump stop 10 is securely mounted to the motorcycle seat 14 and ready for use.

The bottom surface 29b (shown in FIG. 3) forms a gripping surface that frictionally engages the motorcycle seat 14. The gripping surface of the bottom surface 29b has a coefficient of friction that is high enough to prevent sliding relative to the motorcycle seat 14 while the rider is sitting on the motorcycle 12, as in FIG. 1. In this embodiment, the bottom surface 29b is formed of a woven or textured rubber or rubber-like material or other form of non-slip material, but in other embodiments may be other suitable material, e.g., such as cloth fiber (e.g., polyester, acrylic, yarn fibers, elastic, rayon, etc.), with a non-slip coating. In this embodiment, the non-slip material is rubber, which may include natural or synthetic rubber, nitrile, latex, or vulcanized rubber, etc. Furthermore, the non-slip material may include epoxy resin, silicone, PVC, etc., a mixture of these, or any other non-slip materials known to those skilled in the art.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A method for removably mounting a seat bump stop on a motorcycle seat of
   a motorcycle, the method comprising the steps of:
   providing the seat bump stop comprising:
      a pad having a first end and a second end separated by a width of 3-8 inches, the pad having a height that is about 1.5 inches; and
      a mounting system for adjustably and removably mounting the pad on the motorcycle seat, the mounting system including a first strap attached to the first end of the pad, a second strap attached to the second end, and a fastener;
   lift the motorcycle seat to a raised position;
   wrapping the first and second straps around the motorcycle seat, so that the pad is positioned on top of the motorcycle seat in a desired location;
   fastening the first and second straps together via the fastener so that the seat bump stop system is positioned around the motorcycle seat; and
   lowering the motorcycle seat to a lowered position.

2. The method of claim 1, wherein the pad has a width that is about 4.5 inches.

3. The method of claim 1, wherein the pad has a bottom surface that includes a non-slip gripping surface that frictionally engages the motorcycle seat.

4. The method of claim 3, wherein the non-slip gripping surface is rubber or rubber-like material.

5. The method of claim 3, wherein the non-slip gripping surface is epoxy resin, latex, silicone, or a combination thereof.

6. The method of claim 1, wherein the pad of the seat bump stop includes an insert within an outer layer, the insert being constructed of soft and yielding material.

7. The method of claim 6, wherein the insert is constructed of foam.

* * * * *